United States Patent [19]

Boisserand

[11] 3,777,776

[45] Dec. 11, 1973

[54] FLUID DISTRIBUTOR

[76] Inventor: Monique Boisserand, "Le Belvedere", 38-Voiron, France

[22] Filed: Mar. 31, 1972

[21] Appl. No.: 239,933

[30] Foreign Application Priority Data
Apr. 2, 1971 France .............................. 7111740

[52] U.S. Cl. ............... 137/270, 137/609, 137/636.1
[51] Int. Cl. ......................................... F16k 31/524
[58] Field of Search ................... 137/270, 597, 596, 137/595, 599.1, 609, 628, 624.13, 636.1; 91/36, 39; 251/252, 253, 254, 256, 258

[56] References Cited
UNITED STATES PATENTS

| | | |
|---|---|---|
| 1,844,086 | 2/1932 | Aufuldish ........................ 137/636.1 |
| 2,275,963 | 3/1942 | Herman et al. ...................... 137/636 |
| 2,539,221 | 1/1951 | Badeaux .......................... 137/599.1 |
| 2,934,091 | 4/1960 | Chapou ........................ 137/636.1 X |

*Primary Examiner*—Robert G. Nilson
*Attorney*—Richard C. Sughrue et al.

[57] ABSTRACT

A fluid distributor valve including a solid disc-like body having a central hole surrounded by a plurality of cylindrical holes, and end covers on the body defining two chambers, one on each end; there is a sliding gate valve in each cylindrical hole, and a part or pipe from each hole to one chamber. The positions of the valves are determined by two cam plates, one in each chamber, rotation of which by means of a shaft passing through the central hole, causes the valves to move endwise in their holes and cover or uncover the parts.

5 Claims, 10 Drawing Figures

FLUID DISTRIBUTOR

The present invention concerns a fluid distributor having at least one collecting chamber, and one or more feed pipes to one or more discharge pipes, the distributor, by selection of these pipes, establishing in succession various distribution circuits for the fluid.

Certain known distributors, called flap valve distributors, comprise a single collecting chamber in which a plurality of pipes terminate, each pipe being provided with a flap or piston valve operation of which connects or disconnects the pipe in question. This collecting chamber supplies fluid to all the pipes which are simultaneously open.

These distributors have the disadvantage inherent in the use of a flap valve, of being sensitive to pressure changes which may arise in the fluid, this causing partial, but premature, opening of one or more flap valves and thus suddenly changing the circuits receiving the discharge of the fluid. Furthermore, the operation of each flap valve is limited to the partial or total shutting off of the respective pipe and does not make it possible to direct the supply of fluid alternatively to one or other of a plurality of independent chambers, this preventing the possibility of simultaneously establishing a plurality of independent fluid circuits.

The distributor of the present invention avoids the disadvantages described above.

According to the invention there is provided a fluid distributor having at least one collecting chamber through which one or more feed pipes may be connected to one or more discharge pipes and, by a selection of these pipes, to establish in succession different distribution circuits for the discharge of one or more fluids, the device comprising at least one middle block with a central well in which a driving shaft rotates and with several cylindrical holes or apertures with lateral openings for the connection of the said pipes, each communicating with at least one of the said cylinders; a sealed cover and sealed base, the cover being on the upper part of the block and defining a first chamber above said block the base on the lower part of the block and defining a second chamber below said block; two cam plates having complementary profiles, concentric with the axis of the well and connected together by the driving shaft, the upper one located in the first chamber, the lower one located in the second chamber; one or more gate valves each mounted to slide in a cylinder and each having an inner cavity, the two ends resting against on the upper and lower cam plates respectively all of the cylinders have their axes equidistant from the axis of the central well and are disposed in a crown around said well, each cylinder communicating laterally at one of its ends with one of the two chambers; the whole being so arranged that the rotation of the cam plates causes each of the gate valves to slide in its cylinder simultaneously or in succession, alternately producing the shutting off of the cylinder or providing a connection between one of the chambers with the pipe or pipes terminating in said cylinder.

The invention will be more clearly understood from the following description and the accompanying drawings which refer to one embodiment thereof, by way of example and not as a limitation.

Figure 1:
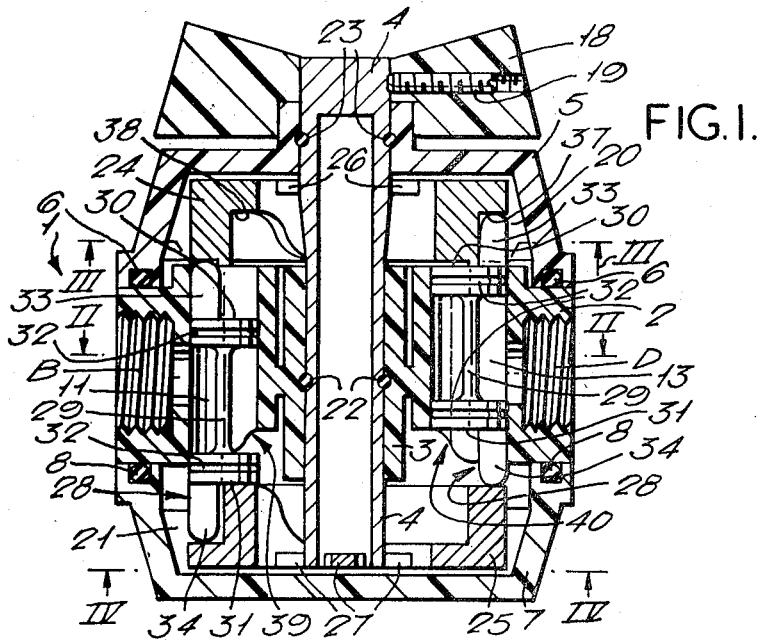
FIG. 1 is an axial section taken on the line I — I of FIG. 2 through a distributor according to the present invention.
Figure 2:
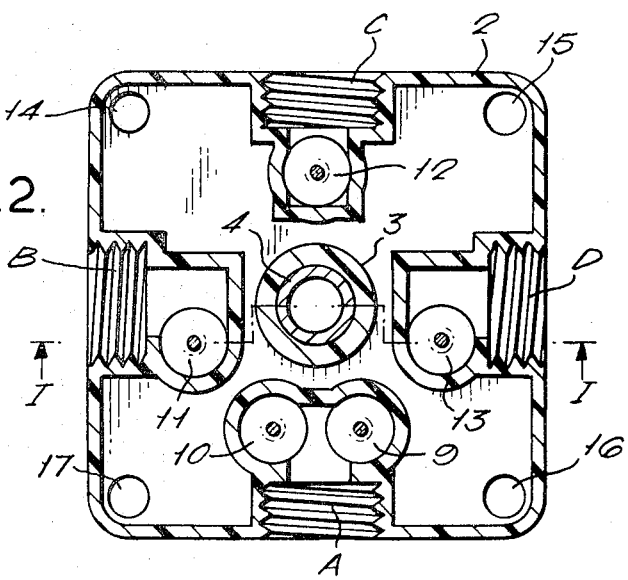
FIG. 2 is a section through the same distributor taken on the line II — II of FIG. 1.

With reference to FIGS. 1 and 2, the distributor 1 comprises firstly a medium central block 2, constructed by injection moulding from plastics material, pierced through its entire thickness by a centre well 3 in which a driving shaft 4 rotates with a cover 5 sealingly secured on the upper part of the block 2 and comprising a seal 6; there is also a base 7 secured to the lower portion of the block 2 and compressing a seal 8.

The block 2 defines a plurality of cylindrical apertures 9, 10, 11 12 and 13 disposed about the well 3, the axes of which are all at the same distance from that of the well and in the embodiment shown, parallel thereto. The block 2 also defines lateral openings A,B,C and D to which the fluid feeding or discharging pipes which communicate with the apertures 9 and 10 (A), 11 (B), 12 (C) and 13 (D) are connected.

The block 2 has, as will be apparent from FIG. 2, a hollowed-out configuration which reduces the weight thereof and the quantity of material required to manufacture it, particularly since the block is made by the injection moulding of a plastics material. Four openings 14, 15 16 and 17 make it possible to secure the cover 5 and the bottom 7 to the block 2. It should be noted that although it is more rational to provide the cylinders 9, 10, 11, 12 and 13 so that they are parallel with the axis of the well 3 this condition is not imperative, and they may be given a certain incline provided that their axes remain in planes parallel with the axis of the well 3 and the other members forming the distributor are similarly formed.

A driving shaft 4 is provided with a control handle 18 made in one piece together therewith, or secured to its upper portion, by means of a grub screw 19. The cover 5, through which the end of the shaft 4 extends, defines a first chamber 20 above the block 2, and the bottom 7 defines a second chamber 21 below the block 2. A seal between these two chambers is ensured by the presence of an O ring 22 located in the inner wall of the well 3 and in contact with the surface of the shaft 4. A seal where the shaft 4 passes through the cover is provided by O ring 23.

Figure 3:
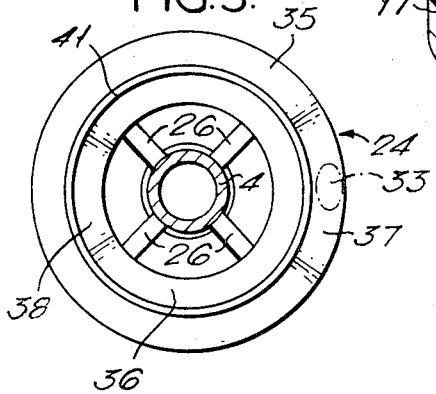
FIG. 3 is a section taken on the line III — III of FIG. 1 through a part of the distributor, the cover of which is removed.
Figure 4:
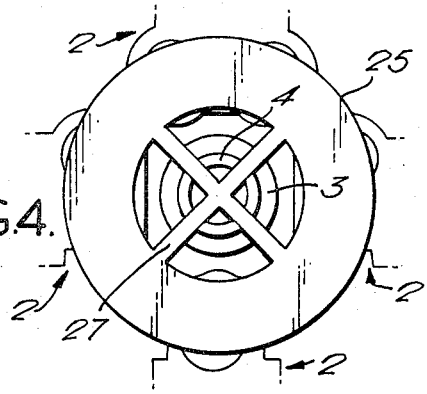
FIG. 4 is a partial view from below of the same distributor, with the bottom removed, taken on the line IV — IV, of FIG. 1.

With reference to FIGS. 3 and 4, the distributor 1 also comprises two disc-like cam plates having complementary profiles, centred on the axis of the well 3 and connected together by the driving shaft 4, the upper one 24 being disposed in the first chamber 20 and the other lower one 25 located in the second chamber 21. These cams are formed of a plastics material and are removably secured to the shaft 4, which drives them with similar angular displacements. They are so secured by cross-pieces 26 carried by cam plate 24 and engaging with shaft 4, or by the force fitting of a cross 27 with which the cam plate 25 is provided to the lower end of the shaft 4. This type of attachment makes it possible to change the cam plates easily and to replace them by cam plates having different profiles, according to the type of circuits it is desired to establish between the various conduits terminating at the distributor 1.

The distributor comprises a plurality of gate valves 28 each mounted to slide in its respective cylindrical aperture such as 9, 10, 11 or 13, between the two cam plates. Each gate valve 28 includes a centre rod 29 with piston heads 30 and 31 respectively at each of its ends the heads defining an inner cavity and each provided with a sealing ring 32. Beyond each of the piston heads 30, 31, each gate valve terminates in an extension 33, 34 respectively, which extensions bear on the two cam plates 24, 25 respectively.

Although cam plates having only one track may be sufficient, the possibilities of the distributor are increased by providing it with cam plates each having two tracks, such as those shown in the drawings. These cam plates each have an outer track and an inner track, separated on the upper cam plate shown in FIG. 3, by a circular rib 41. On the upper cam plate, the profiles of each of the two tracks comprise oppositely disposed plates 35 and 36 respectively, interrupted by short rises 37 and 38 respectively. Two tracks thereof having complementary profiles are carried by the cam plates. To permit the gate valves 28 to be actuated by the outer tracks or by the inner tracks of the cam plates, the extensions 33 and 34 are axially displaced and have a vertical section width not exceeding the width of a track.

It is thus possible to modify the construction of the fluid distribution circuits by rotating all the gate valves through 180°; if they have previously been engaged by the outer tracks of the cam plates, they are then engaged by the inner tracks or vice versa.

Hence, whilst, in FIG. 1, the gate valves are actuated by the outer tracks of the cam plates, they are actuated by their inner tracks in FIGS. 5 – 10.

Each of the cylinders communicates laterally at one of its ends with one of the two chambers 20 or 21. The cylinder 12, which is not provided with a gate valve, communicates with the first chamber 20 as also the cylinder 10, whilst the cylinders 9, 11 and 13 all communicate particularly 11 at the point 39 and 13 at the point 40, with the second chamber 21.

Figure 5:
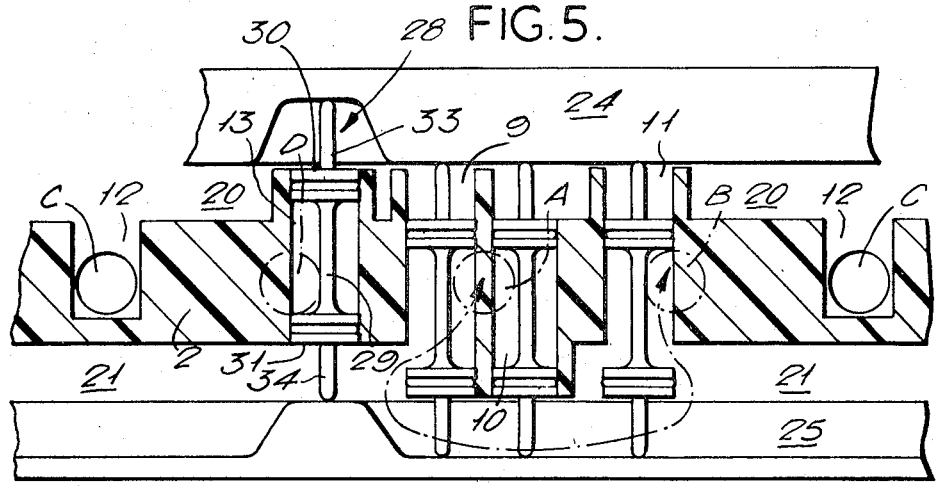
FIGS. 5, 6, 7, 8 and 9 show schematically the successive operations of a distributor and the various possible distribution circuits using one pair of cam plates.

As shown by FIGS. 5, 6, 7, 8 and 9 rotation of the cam plates by rotation of the shaft 4, causes sliding of each of the gate valves in succession in its cylinder and hence the shutting off of the cylinder or the connection, through its intermediary, of one of the chambers with the pipe or pipes terminating in the cylinder, and the establishment of various circuits in succession for the discharge of fluid. In FIG. 5, with the gate valve of the cylinder 13 raised and the three others lowered, the pipe C alone is in communication with the first chamber 20 and the cylinders 9 and 11 are in communication with the second chamber 21, thus establishing a circulation of the fluid between the pipes A and B via the second chamber 21.

Figure 6:
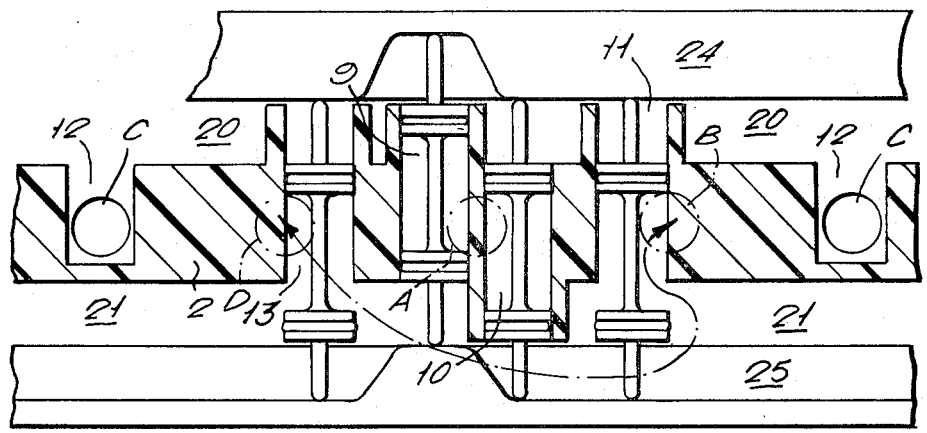

In FIG. 6, the gate valve of the cylinder 9 is raised and the three others lowered, so that the pipe C is in communication with the first chamber 20 and the cylinders 13 and 11 are connected to the second chamber 21, thus establishing a circulation of fluid between the pipes D and B via the second chamber 21.

Figure 7:
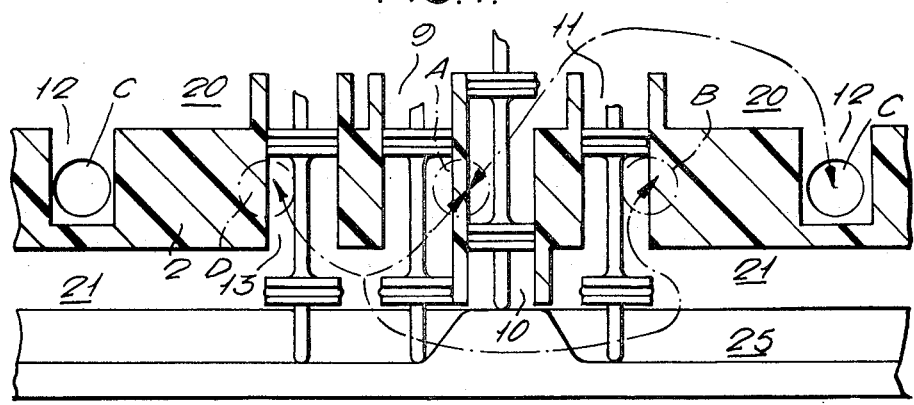

In FIG. 7, since the gate valve of the cylinder 10 is raised and the other three lowered, the pipe C and the cylinder 10 are connected to the first chamber 20, whilst the cylinders 13, 9 and 11 are connected to the second chamber 21, thus establishing both a circuit common to the pipes A, B and D via the second chamber 21 and a circuit between the pipe 8 and the pipe C via the first chamber 20.

Figure 8:
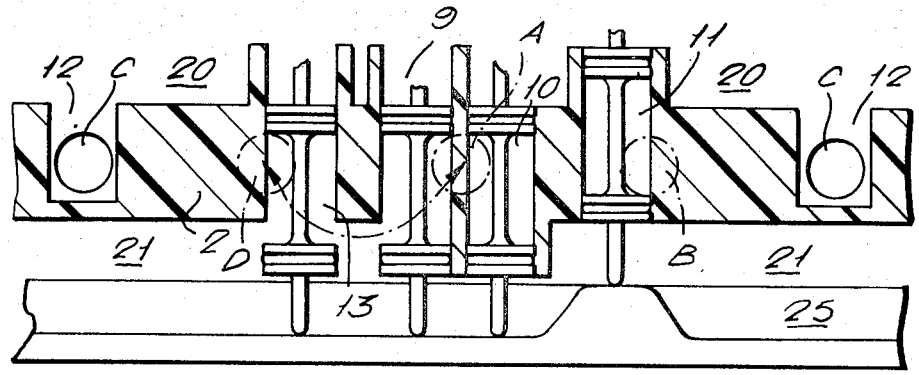

In FIG. 8, since the gate valve of the cylinder 11 is raised and the three others lowered, only the pipe C is connected to the first chamber 20 and only the cylinders 13 and 9 are connected to the second chamber 21, thus establishing a circulation of fluid between the pipes D and A via the second chamber 21.

Figure 9:
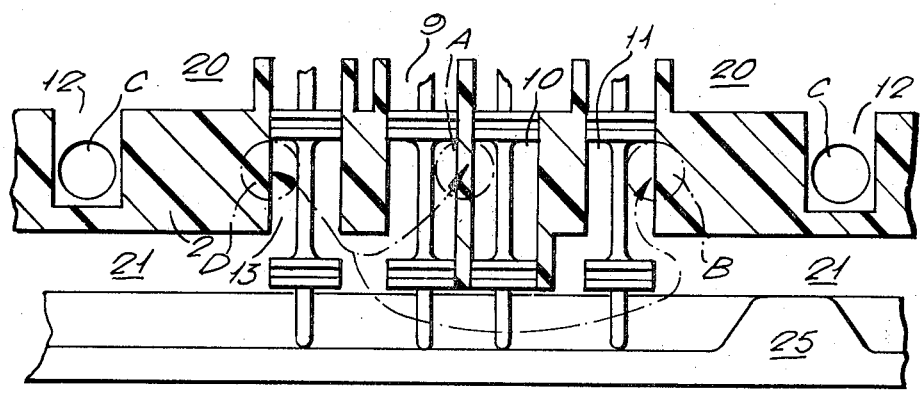

In FIG. 9, since all the gate valves are lowered, only the pipe C is connected to the first chamber 20, whilst the three cylinders 13, 9 and 11 are connected to the second chamber 21 thus establishing a circuit for the circulation of fluid between the pipes D, A and B via the second chamber 21.

For claity, only the lower cam plate 25 is shown in FIGS. 7, 8 and 9.

Figure 10:
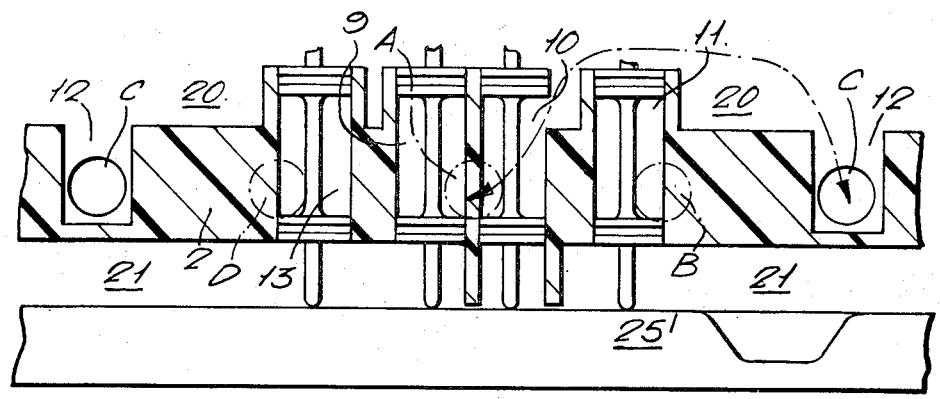
FIG. 10 shows schematically one of the possible operations of the same distributor, using another pair of cam plates.

In FIG. 10, the distributor 1 is provided with two cam plates the profiles of which, while complementary, are different from those of the cam plate used in the preceding example (FIGS. 5 – 9). For greater clarity, only the lower cam plate 25' is shown. In particular, these cam plates make it possible, as is the case of the operation shown in FIG. 10, to keep all the gate valves raised, which causes the pipe C and the cylinder 10 to connect to the first chamber 20 and establishes a circuit for the circulation of fluid between this pipe C and the pipe A, via the first chamber 20, whilst no circuit is established via the second chamber 21.

On each of the FIGS. 5 – 10, the circuits for the circulation of fluid are shown by paths indicated by arrows at each of their ends, thus showing that these circuits can be traversed in either direction the fluid feeding pipe being naturally also to play the part of discharge (or delivery)pipe.

It will be noted that the chambers 20 and 21 can play the part of fluid mixers and the distributor can sometimes, and for a given angular position of the cams, function as a simple tap. The middle block is removable and may be replaced by any other block pierced by cylinders in the same way as the cam plate. It will therefore be understood that by varying the profiles of the cam plates and by changing the middle block it is possible to obtain a practically unlimited range of circuits for different fluids. The chambers are capable of working independently and permit the distributor to direct two separate circuits of fluids simultaneously without interference between them.

Although a particular embodiment of the fluid distributor of the invention has been described and illustrated in the drawings, it is understood that a person skilled in the art may apply thereto any modifications of shape or detail, within the scope of the appended claims.

I claim:

1. A fluid distributor having at least one collecting chamber through which one or more feed pipes to said distributor may be selectively connected to one or more discharge pipes from said distributor to establish in succession different distribution circuits for the discharge of one or more fluids, said distributor comprising at least one middle block defining a central well and a plurality of cylindrical holes or cylinders with lateral openings for the connection of said pipes, each pipe communicating with at least one of the said cylinders; a driving shaft within said well, a sealed cover and sealed base, said cover being on the upper part of said block and defining a first chamber above said block, said base being on the lower part of said block and defining a second chamber below said block; upper and lower cam plates having complementary profiles concentric with the axis of said well and connected together by said driving shaft, the upper cam plate located in said first chamber, the lower cam plate located in said second chamber; a plurality of gate valves each mounted to slide in a cylinder and each defining an inner cavity, the ends of said valves resting against said upper and lower cam plates respectively; all of said cylinders having their axes equidistant from an axis of said central well and disposed around said well, each cylinder communicating laterally at one of its ends with one of said two chambers; the whole being so arranged that rotation of said cam plates causes each of said gate valves to slide in its respective cylinder as determined by said cam plates, either to shut off said cylinder or to provide a connection between one of said chambers with a pipe terminating in said cylinder.

2. A fluid distributor as recited in claim 1, wherein each gate valve defines an inner cavity, and is terminated by two piston heads, one at each end, a sealing ring on each head, each head including an extension bearing on one of said cam plates.

3. A fluid distributor as recited in claim 2, wherein each of said cam plates is provided with two concentric bearing tracks for said extensions, said tracks having different profiles and a circular separating rib on at least one of said cam plates, said extensions being displaced from the axis of the respective valve and having an oblong vertical section enabling said extensions to bear on one track and by rotation of said gate valve through 180°, to bear on the other track after reassembling of said distributor.

4. A fluid distributor as recited in claim 1, wherein said cam plates are removably secured to said driving shaft.

5. A fluid distributor as recited in claim 1, including a hand wheel supported by said driving shaft to cause angular displacements of said cam plates.

* * * * *